United States Patent
Link, II et al.

(10) Patent No.: US 9,123,060 B2
(45) Date of Patent: Sep. 1, 2015

(54) SYSTEM AND METHOD FOR PROVIDING SHORT MESSAGE TARGETED ADVERTISEMENTS OVER A WIRELESS COMMUNICATIONS NETWORK

(71) Applicant: AT&T Intellectual Property I, L.P., Atlanta, GA (US)

(72) Inventors: Charles M. Link, II, Atlanta, GA (US); Donald M. Cardina, Lawrenceville, GA (US); Vernon Meadows, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/275,323

(22) Filed: May 12, 2014

(65) Prior Publication Data
US 2014/0244397 A1    Aug. 28, 2014

Related U.S. Application Data

(63) Continuation of application No. 14/021,660, filed on Sep. 9, 2013, now Pat. No. 8,725,127, which is a continuation of application No. 13/543,103, filed on Jul. 6, 2012, now Pat. No. 8,532,635, which is a (Continued)

(51) Int. Cl.
*H04M 3/42* (2006.01)
*G06Q 30/02* (2012.01)
(Continued)

(52) U.S. Cl.
CPC ............ *G06Q 30/0267* (2013.01); *G06Q 30/02* (2013.01); *G06Q 30/0207* (2013.01);
(Continued)

(58) Field of Classification Search
USPC ...................... 455/414.1, 414.2, 414.3, 414.4, 455/456.1–456.7, 412.1, 412.2, 445, 500, 455/517, 403, 422.1, 426.1, 426.2, 455/406–408; 705/14.1, 14.23, 14.58, 705/14.64; 340/5.39, 7.2, 7.21, 7.22, 7.23, 340/7.24, 7.26, 7.28; 709/203, 218, 219
See application file for complete search history.

(56) References Cited

U.S. PATENT DOCUMENTS 4,775,999 A    10/1988  Williams
5,588,042 A    12/1996  Comer
(Continued)

OTHER PUBLICATIONS

International Application No. PCT/US02/10141 International Search Report dated Jul. 19, 2002.

(Continued)

*Primary Examiner* — Keith Ferguson
(74) *Attorney, Agent, or Firm* — Hartman & Citrin LLC

(57) ABSTRACT

A method and system for providing targeted advertisement information to consumers over a wireless communications network are provided. In one embodiment, local advertisers register to advertise on wireless communications devices that are in close proximity to the advertiser. As a consumer enters a cell site that is near the location of the advertiser, the wireless network delivers a message to the wireless device specified by the local advertiser. An acknowledgement signal is then received by the network, and the local advertiser's account is charged for transmission of the advertisement. In a further embodiment, each of the messages is associated with one or more demographic codes, and a demographic code is selected to describe an advertisement preference of a user of a wireless communications device. Messages to be transmitted to particular wireless communications devices are selected based upon both the location information and the demographic codes associated with the messages.

20 Claims, 7 Drawing Sheets

Related U.S. Application Data continuation of application No. 13/167,146, filed on Jun. 23, 2011, now Pat. No. 8,249,565, which is a continuation of application No. 12/406,234, filed on Mar. 18, 2009, now Pat. No. 7,995,996, which is a continuation of application No. 11/303,649, filed on Dec. 15, 2005, now Pat. No. 7,526,278, which is a continuation of application No. 09/822,504, filed on Apr. 2, 2001, now Pat. No. 6,993,326.

(51) Int. Cl.
  *H04W 4/14* (2009.01)
  *H04W 8/18* (2009.01)
  *H04W 4/02* (2009.01)
  *H04L 29/08* (2006.01)

(52) U.S. Cl.
  CPC ........ *G06Q30/0239* (2013.01); *G06Q 30/0251* (2013.01); *G06Q 30/0261* (2013.01); *G06Q 30/0269* (2013.01); *G06Q 30/0277* (2013.01); *H04W 4/14* (2013.01); *H04L 67/26* (2013.01); *H04W 4/02* (2013.01); *H04W 8/18* (2013.01)

(56) References Cited

U.S. PATENT DOCUMENTS

| | | |
|---|---|---|
| 5,590,092 A | 12/1996 | Fehnel |
| 5,621,784 A | 4/1997 | Tiedemann, Jr. et al. |
| 5,852,775 A | 12/1998 | Hidary |
| 6,041,234 A | 3/2000 | Oksanen et al. |
| 6,161,142 A | 12/2000 | Wolfe et al. |
| 6,313,732 B1 | 11/2001 | DeLuca et al. |
| 6,353,398 B1 | 3/2002 | Amin et al. |
| 6,385,592 B1 | 5/2002 | Angles et al. |
| 6,681,114 B2 | 1/2004 | Chang et al. |
| 7,231,357 B1* | 6/2007 | Shanman et al. .......... 705/14.23 |
| 7,283,827 B2 | 10/2007 | Meadows et al. |
| 2002/0032035 A1 | 3/2002 | Teshima |
| 2002/0095333 A1* | 7/2002 | Jokinen et al. .................. 705/14 |
| 2002/0102993 A1 | 8/2002 | Hendrey et al. |
| 2002/0107027 A1 | 8/2002 | O'Neil |
| 2002/0116271 A1 | 8/2002 | Mankoff |
| 2003/0190921 A1 | 10/2003 | Stewart |

OTHER PUBLICATIONS

International Application No. PCT/US02/10141 International Preliminary Examination Report dated Aug. 15, 2003.
U.S. Official Action dated Apr. 21, 2004 in U.S. Appl. No. 09/822,504.
U.S. Official Action dated Nov. 3, 2004 in U.S. Appl. No. 09/822,504.
U.S. Notice of Allowance dated Nov. 4, 2005 in U.S. Appl. No. 09/822,504.
U.S. Official Action dated Apr. 2, 2008 in U.S. Appl. No. 11/303,649.
U.S. Notice of Allowance dated Dec. 22, 2008 in U.S. Appl. No. 11/303,649.
U.S. Official Action dated Oct. 28, 2010 in U.S. Appl. No. 12/406,234.
U.S. Notice of Allowance dated Apr. 8, 2011 in U.S. Appl. No. 12/406,234.
U.S. Office Action dated Sep. 12, 2011 in U.S. Appl. No. 13/167,146.
U.S. Notice of Allowance dated Apr. 12, 2012 in U.S. Appl. No. 13/167,146.
U.S. Office Action dated Jan. 7, 2013 in U.S. Appl. No. 13/543,103.
U.S. Notice of Allowance dated May 2, 2013 in U.S. Appl. No. 13/543,103.
U.S. Notice of Allowance dated Dec. 20, 2013 in U.S. Appl. No. 14/021,660.

* cited by examiner

| EVENT | MOBILE NXTREG | CELL 16C REGID/REGINCR | CELL 16A REGID/REGINCR | CELL 16B REGID/REGINCR |
|---|---|---|---|---|
| 1 | 900 | 600/20 | 600/20 | 640/20 |
| 2 | 620 | 602/20 | 602/20 | 642/20 |
| 3 | 620 | 604/20 | 604/20 | 644/20 |
| 4 | 664 | 606/20 | 606/20 | 646/20 |

FIG. 1B

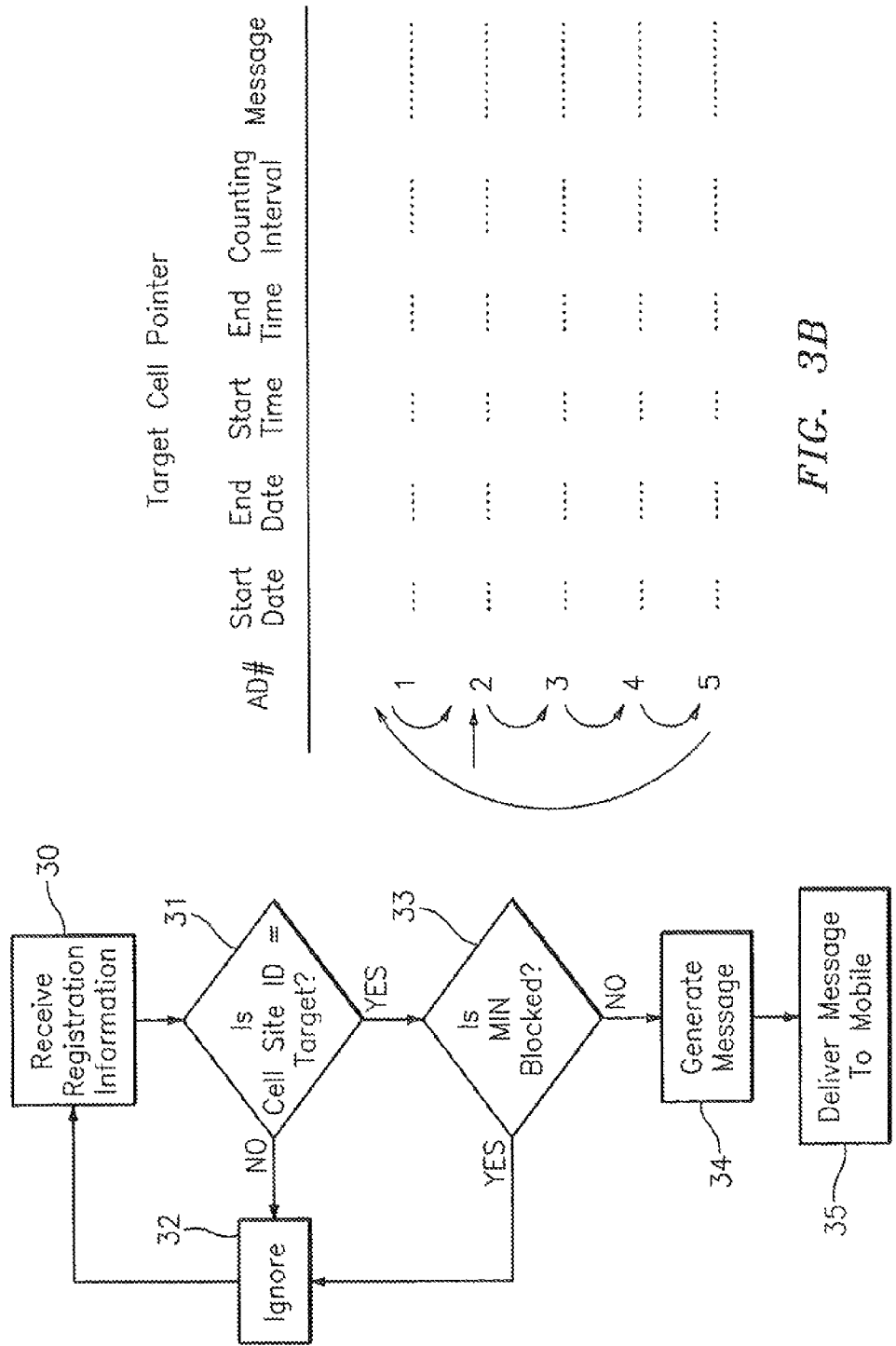

US 9,123,060 B2

SYSTEM AND METHOD FOR PROVIDING SHORT MESSAGE TARGETED ADVERTISEMENTS OVER A WIRELESS COMMUNICATIONS NETWORK

CROSS-REFERENCE TO RELATED APPLICATIONS

This application is a continuation of U.S. patent application Ser. No. 14/021,660, now U.S Pat. No. 8,725,127, filed Sep. 9, 2013, which is a continuation of U.S. patent application Ser. No. 13/543,103, now U.S. Pat. No. 8,532,635, filed Jul. 6, 2012, which is a continuation of U.S. patent application Ser. No. 13/167,146, now U.S. Pat. No. 8,249,565, filed Jun. 23, 2011, which is a continuation of U.S. patent application Ser. No. 12/406,234, now U.S. Pat. No. 7,995,996, filed Mar. 18, 2009, which is a continuation of U.S. patent application Ser. No. 11/303,649, now U.S. Pat. No. 7,526,278, filed Dec. 15, 2005, which is a continuation of U.S. patent application Ser. No. 09/822,504, now U.S. Pat. No. 6,993,326, filed Apr. 2, 2001, the entire contents of each expressly incorporated herein by reference.

BACKGROUND

1. Field of the Invention

The present invention relates generally to wireless communications technologies, and more particularly, to a method and system for providing targeted advertisements to consumers through wireless communications devices.

2. Background of the Invention

As wireless communications technology continues to improve and become a more affordable, the general public is becoming increasingly dependent upon wireless communications devices to communicate with others when conventional land line telephones are unavailable. Whether through cellular telephones, interactive pages, networked personal digital assistants, or other such devices, users can communicate with others by voice or e-mail from virtually any location. As a result, many users are almost always accessible, even while driving or shopping.

As is generally known, wireless communications devices communicate through a network of cells covering geographical areas, each having a base station for transmitting and receiving messages to and from cellular communications devices within a respective cell region. A plurality of base stations is connected to a Mobile Telephone Switching Office (MTSO), which acts as a controller for the cellular system. The MTSO is also connected to the Public Switched Telephone Network (PSTN) to allow communications between cellular devices and landline telephones or computer systems.

Wireless networks generally utilize an autonomous registration system to track the location and status of the wireless devices that can operate on the network. The identification information typically informs the system where the wireless device is located in the system, so that the wireless device can be subsequently paged when receiving a call or signal. Wireless devices communicate with the network over dedicated control channels to transmit registration information and to receive pages and other signaling information. For example, when a cellular telephone user receives a call, the network first sends a page to the cellular site where the target cellular telephone was last registered. The signal is then broadcast throughout the cell site over a control channel. If the target wireless device is within the expected area, the user responds to the page (e.g., a ringing or vibrating signal) to begin communicating with the caller over a pair of voice channels allocated for the communication. If the target wireless device is not located within the expected area, the network may broadcast signal information over control channels in surrounding cell sites or regions to locate the device. The particular implementation of a registration system for a wireless network is generally designed such that the network can quickly and efficiently locate the targeted wireless devices. One technique for performing autonomous registration is described in U.S. Pat. No. 4,775,999, which is incorporated herein by reference.

Recent technological advances in digital user interfaces have added versatility to wireless communications devices by enabling users to access text and graphics information over the screen of the device. For example, most digital cellular telephones at a minimum display the current time and date. Many cellular telephones also include personal telephone number and address directories. It is not uncommon for digital cellular telephones to also allow users to receive numeric pages and text messages on the screen of the device. As more features and applications converge into wireless communications devices, users are increasingly relying upon such devices as an essential tool for both personal organization and wireless communication.

Although wireless communications devices are used for voice-based telephone or text-based e-mail communications, it has not been known to effectively utilize such devices to receive targeted consumer advertisement information. Through media such as signs and billboards, television and radio advertisements, or newspaper coupons and flyers, consumers are continually subjected to different forms of advertising and promotions of products and services throughout each day. Unfortunately, most advertising in these conventional formats is ineffective, because the advertisements do not target persons who would be likely to buy the product. For example, television, radio, or newspaper advertising for a local diner or restaurant is unlikely to be of interest to persons who are not located reasonably close to the advertised establishment. Many people are therefore unreceptive to traditional methods of advertising because it tends to be overinclusive and irrelevant. Accordingly, there is a need for a method and system for providing advertising that is relevant to the particular recipients of the advertisements.

SUMMARY OF THE INVENTION

In view of the difficulties described above, there is a need for a method and system for providing targeted advertisement information to consumers over a wireless communications network. In one embodiment, local advertisers register to advertise on certain wireless communications devices that are in close proximity to the advertiser. As a consumer enters a cell site that is near the location of the advertiser, the wireless network delivers a message to the wireless device that is specified by the local advertiser. An acknowledgement signal is then received by the network, and the local advertiser's account is charged for transmission of the advertisement.

It is therefore an object of the present invention to provide a method for transmitting a message over a wireless network to a wireless communications device. A plurality of messages is stored in a database, wherein each stored message is associated with one or more locations. Location information of a wireless communications device is detected, and a message in the database associated with the detected location is selected and transmitted to the wireless communications device.

Another object of the present invention is to provide a method for transmitting an advertisement over a wireless network to a wireless communications device based upon location information and category codes. A plurality of advertisements are stored in an advertisements database, wherein each advertisement is requested to be transmitted to wireless communications devices by a respective advertiser, and each advertisement is associated with one or more locations and one or more category codes. Information pertaining to a plurality of wireless communications devices is stored in a devices database, wherein each wireless communications device is associated with identification data and one or more category codes. A list of advertisers requesting transmission of advertisements stored in the advertisements database is stored in an advertisers database, wherein each advertiser is associated with advertiser account information. To perform the method, identification and location information of a wireless communications device is detected. An advertisement in the database that is associated with the detected location and is associated with at least one category code associated with the wireless communications device in the devices database is selected. The selected advertisement is transmitted, and the advertiser account information of the advertiser requesting transmission of the selected advertisement is updated.

Another object of the present invention is to provide a system for transmitting messages over a wireless network to wireless communications devices. The system comprises an advertisements queue for storing a plurality of advertisements requested to be transmitted to wireless communications devices by respective advertisers, wherein each advertisement is associated with one or more locations. An advertisers database stores a list of advertisers requesting transmission of advertisements stored in the advertisements queue, wherein each advertiser is associated with advertiser account information. A processor receives location information of wireless communications devices selecting advertisements in the advertisements queue associated with the location of the respective wireless communications devices. A transmitter transmits the selected advertisements to the respective wireless communications devices.

Yet another object of the present invention is to provide a system for transmitting messages over a wireless network to wireless communications devices. An advertisements queue stores a plurality of advertisements requested to be transmitted to wireless communications devices by respective advertisers, wherein each advertisement is associated with one or more category codes. A users database stores user identification information of wireless communications devices operating on the wireless network, wherein the user identification information includes one or more category codes associated with preferences of the respective user. A processor receives the user identification information of a wireless communications device and selects an advertisement in the advertisements queue associated with at least one category code in the user identification information. A transmitter transmits the selected advertisement to the respective wireless communications device.

DESCRIPTION OF THE DRAWINGS

FIG. 1B is a table of events that illustrates the process of registration in accordance with the example of FIG. 1A.

FIG. 3A is a flow diagram of a process of transmitting messages to non-blocked wireless communications devices located in target cell sites, in accordance with an embodiment of the present invention.

FIG. 3B is a table of an advertisement queue in accordance with an embodiment of the present invention.

DETAILED DESCRIPTION OF THE INVENTION

The present invention provides a wireless network advertising system that receives requests to transmit advertisement information to certain wireless communications devices that are located within a reasonable proximity to the advertiser. In this manner, the advertiser can target advertising to users who are likely to be interested in the advertised product or service. Further, the advertiser can frequently change the advertised message or offer or change the frequency by which the advertisement is transmitted, thereby maximizing the effectiveness and cost associated with the advertisements. The advertising system can track the usage of the advertising system and charge the advertiser based upon whether the advertisement is actually transmitted to users. In alternative embodiments, the advertiser can specify or the network can automatically determine which consumers should receive particular advertisements, according to different categories associated with the advertised product or service, and according to the demographics of the potential recipients.

Figure 1A:
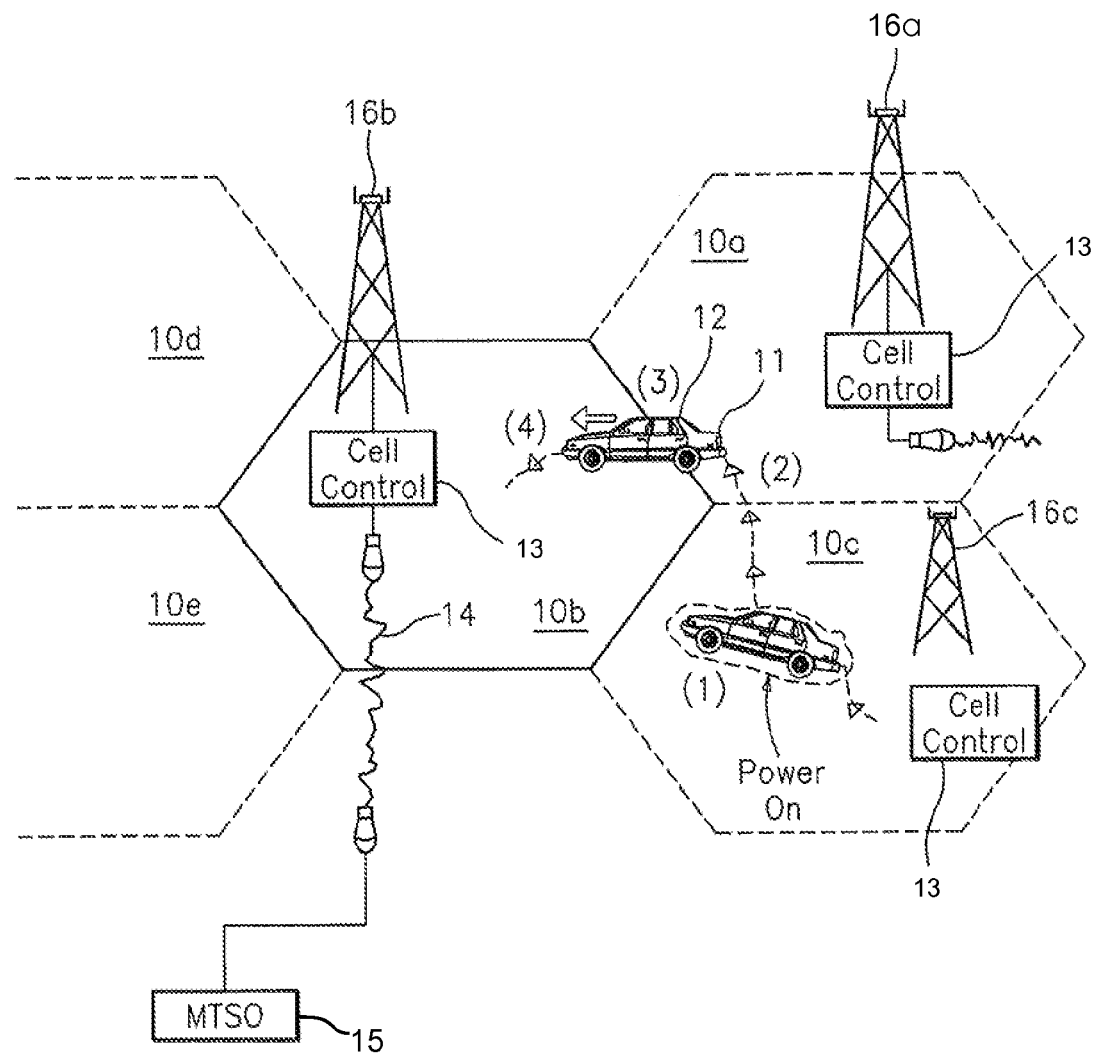
FIG. 1A is a schematic diagram of a portion of a cellular network that illustrates an example of the process of registration in accordance with an embodiment of the present invention.

The present invention will now be described in more detail with reference to the figures. FIG. 1A is a schematic diagram of an automobile travelling through a portion of a cellular network, which illustrates the process of registration in accordance with an embodiment of the present invention. Automobile 11, containing a wireless communications device or "mobile" 12, is travelling from cellular region 10c, through cellular region 10a, and into cellular region 10b, in a wireless communications network. As will be described in further detail with reference to FIG. 1B, while the automobile was located in cellular region 10c as indicated by event (1), the operator of the wireless communications device 12 turns on the power to the mobile, and the mobile then registers with the wireless network. The automobile then travels into cellular region 10a, as indicated by event (2). As the automobile moves between cellular regions 10a and 10b, the mobile 12 re-registers with the network, as indicated by event (3). Finally, the automobile continues travelling within cellular region 10b, as indicated by event (4).

I. Mobile Registration

Figure 2A:
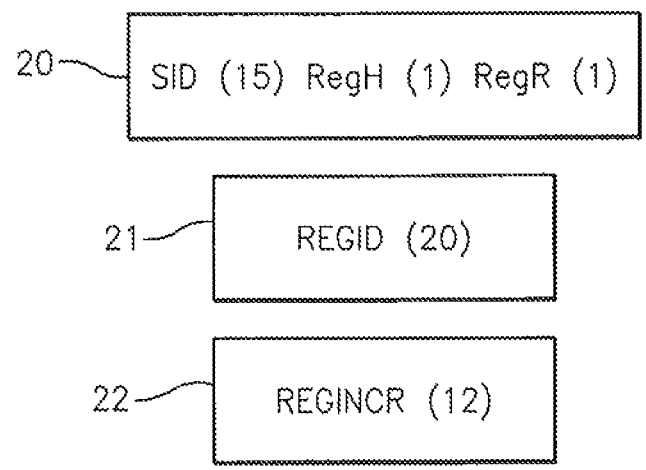
FIG. 2A is a schematic diagram of the data transmitted over the forward control channel of a wireless network in accordance with an embodiment of the present invention.

Mobile registration permits calls to the mobile to be automatically delivered, even though the mobile may be moving between different cellular regions in the wireless network. Autonomous registration is controlled by the wireless network system through certain information transmitted to the mobiles in the form of an "overhead message train" (OMT). As shown in FIG. 2A, the OMT is transmitted on the paging/access channels within the cellular regions, approximately once a second. The OMT includes an overhead message having parameters 20 for System ID (SID), Register Home (REGH), Register Rome (REGR), and periodically also contains parameters 21 and 22 for Registration ID (REGID) and Registration Increment (REGINCR). OMTs are broadcast via each of the cell towers in the different cellular regions throughout the network. Although it is possible for each cell tower to broadcast much of the same data in the OMTs, the REGID in the OMT messages may be different in different cellular regions, as described in the example provided below. The mobiles located throughout the network that are in an idle mode detect the strongest respective OMT signal, which is often from the closest cell tower, and subsequently perform internal checking operations according to the received OMT message and the data stored in the mobile internal memory.

Figure 2B:
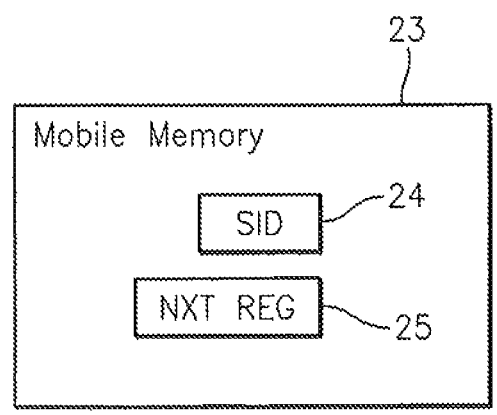
FIG. 2B is a schematic diagram of a portion of mobile memory in accordance with an embodiment of the present invention.

As shown in FIG. 2B, the memory 23 of each mobile contains a System ID (SID) parameter 24 to identify the cellular system upon which the mobile is operating, and a Next Registration (NXTREG) parameter 25 that is used to determine when the mobile should re-register within the cellular system. Upon detecting the OMT, the mobile checks if the SID in the OMT matches the stored SID, which indicates that the mobile is in the "home" mode. The mobile then checks the REGID value in the OMT, which is incremented regularly at each base site in the cellular system in a repeated cycle between zero and an upper limit. If the REGID received is greater than or equal to the NXTREG in memory (REGID≥NXTREG), or if the REGID is less than or equal to (≤NXTREG−REGINCR-5), then the mobile performs the step of re-registering with a nearby cell tower.

A mobile first scans a group of paging/access channels and selects the channel with the strongest signal strength. The mobile then tunes to the selected paging/access channel. During registration, the mobile then reads the REGINCR and the REGID from the OMT, adds these values together, and stores the sum as the NXTREG in mobile memory (NXTREG=REGID+REGINCR).

Figure 2C:
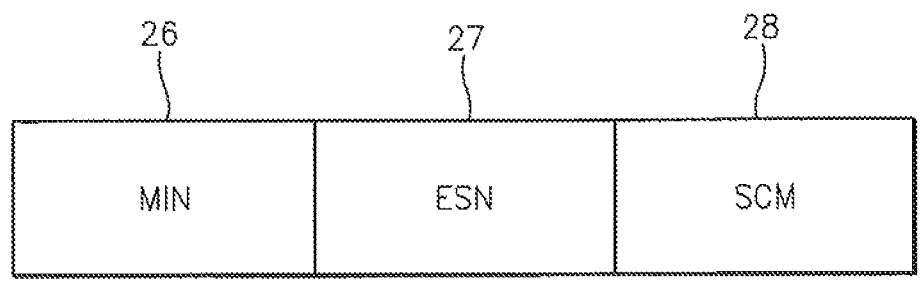
FIG. 2C is a schematic diagram of the information provided by a wireless communications device over the reverse control channel during registration, in accordance with an embodiment of the present invention.

As shown in FIG. 2C, a mobile transmits a data packet as part of the registration process to provide its identification parameters to the system. These generally include the mobile electronic serial number (ESN) 27 in Hex, the associated telephone number or "mobile identification number" (MIN) 26 in NPANXXXXXX form in Hex, the "Station Class Mark" (SCM) 28 in Hex, and the number of the cell in which the registrating mobile was detected (not shown). This data record is transmitted over a control channel and received by the cell control circuitry 13 of FIG. 1A at a nearby cell tower, which is in turn transmitted via a cell/MTSO data link 14 to the MTSO 15.

Returning to the example provided in FIG. 1A, with reference to the table of events in FIG. 1B, the mobile first performs a "power up" feature in cell region 10c as indicated by event (1), after which the mobile receives the OMT broadcast from cell tower 16c. As shown in FIG. 1B, the NXTREG value stored in mobile 12 is "900," and the REGID and REGINCR received in the OMT from cell tower 16c are "600" and "20," respectively. Since REGID ("600")≤NXTREG ("900")−REGINCR ("20")-5, it is apparent that the REGID has been incremented for a sufficient amount of time and the counter has since cycled, or "turned over," to trigger a new registration. In this instance, the mobile has been turned off for a sufficient period of time such that the system cannot rely upon the previous registration information to identify the mobile location. Therefore, the mobile provides its ESN, MIN, SCM, and cell ID information to the cellular system, and stores in mobile memory the received REGID ("600")+REGINCR ("20")="620" as the new NXTREG value.

As the automobile 11 travels into cellular region 10a, the mobile 12 detects the OMT from cell tower 16a as having the strongest signal. As indicated by event (2) in FIGS. 1A and 1B, mobile 12 now compares the stored NXTREG value, "620," with the received REGID, "602," and determines that a re-registration is not necessary. As can be seen, cell towers 16c and 16a broadcast the same REGID in the respective OMTs, which has been incremented since event (1).

As the automobile travels between the border of cellular regions 10a and 10b, the mobile 12 now detects that the OMT from cell tower 16b is stronger than that from cell tower 16a. As indicated by event (3) in FIGS. 1A and 1B, mobile 12 now compares the stored NXTREG value, "620," with the received REGID, "644," and determines that re-registration is again required because REGID≥NXTREG.

In this instance, the REGID broadcast from cell tower 16b has been "skewed" to be different from the REGID of the neighboring cell towers 16a and 16c, forcing a new registration process. The mobile again provides the ESN, MIN, SCM, and the new cell site ID, and stores "644" as the NXTREG.

Finally, in event (4), the automobile continues to travel within cellular region 10b. The NXTREG stored in mobile 12, "664," remains greater than the REGID broadcast in the OMT, and so the mobile 12 refrains from re-registering while in the idle state.

As described and illustrated with reference to the above-identified figures, a mobile can be forced to re-register upon entering certain particular cell sites, where the cell tower has been configured to broadcast a REGID in the OMT that is skewed by a certain amount from the REGID values in OMTs from neighboring cell towers. Upon receiving this registration information into the MTSO 15, the cellular system can now identify that certain, individually identifiable wireless communication devices have entered certain specified cell sites. By identifying and tracking this information in one or more databases, the cellular system can transmit messages or signals to certain of these devices upon an advertiser's request.

Although the mobile registration method as described will enable a cellular system to maintain a database of the relative location and movement of certain wireless communication devices, other such methods of identifying and tracking this information are considered to be within the scope of the present invention.

Such methods for identifying and tracking the relative location and movement of certain wireless communications devices include, but are not limited to, antenna triangulation and the provision and detection of global satellite positioning (GPS) information.

II. Short Message Targeted Advertisements

As the MTSO forwards registration information to the cellular system, a process flow as illustrated in FIG. 3A is performed to deliver targeted advertisement messages to certain mobiles.

In step 30, the cellular system receives registration information from the MTSO 15. At a minimum, this information must include the MIN 26, which identifies the particular mobile, and the cellsite ID. Based upon the cellsite ID provided in the received registration information, the system performs a search in a cellsite advertisement lookup table in step 31 to detect whether any advertisers have registered to send advertisements to mobiles entering the cellsite ID. If there are no available advertisements, the registration is ignored, in step 32, and the process repeats. Otherwise, as an optional embodiment, the system next performs a search in a MIN 26 account table in step 33 to detect whether the subscriber who utilizes the mobile has blocked the advertisement feature. It is foreseen that some customers will wish not to receive advertisements. For those subscribers who have blocked advertisements, the registration is again ignored, in step 32, and the process repeats. If the MIN 26 is not blocked, the system generates a short advertising message in step 34. The advertising message is then delivered to the mobile 12 in step 35.

If a plurality of advertisers has registered to deliver advertisements to mobiles that register in the target cellsite ID, there are a multitude of methods possible for allocating which mobiles are to receive which advertisements. As provided in a table in FIG. 3B, a number of fields can be stored in a database according to each requested advertisement. Upon requesting transmission of advertisements, an advertiser can specify the starting and ending dates for the promotion, the starting and ending time of day for generating the promotion, and the total number of advertisements to be transmitted at given intervals. For example, a local restaurant may desire to send coupons to 100 mobiles that are in the vicinity during the weekday lunch hour, for the first week of each month, for a six month period. A gas station may wish to send coupons to 200 mobiles that are in the same vicinity during the morning rush hour, for the first day of each week, for a one month period. As shown in FIG. 3B, a target cell pointer will cycle through the advertisement requests in step 34 of FIG. 3A until it finds an appropriate advertisement request. When the next advertisement request is received, the target cell pointer will continue cycling through the advertisement requests from that point.

Figure 4:
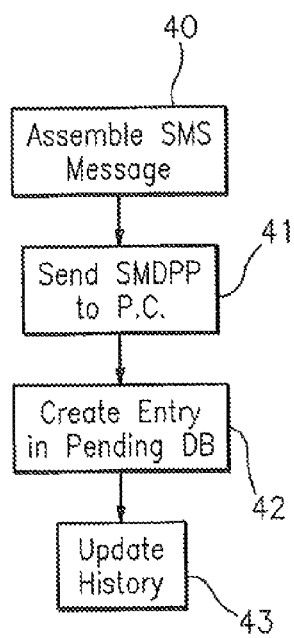
FIG. 4 is a flow diagram of a process for transmitting a message to a wireless communications device in accordance with an embodiment of the present invention.

The message is delivered by transmission over a forward access/control channel that is directed to a particular MIN 26. In the same manner that a cellular telephone receives a signal over a forward control channel to "ring" and announce a caller, a control channel signal may provide a short audible indication of an incoming short message, followed by up to 160 characters of information to be displayed as text across the graphical user interface of the cellular telephone. As provided in FIG. 4, the system in step 40 assembles a short message that is to be delivered. The short message is then sent to short message delivery point to point (SMDPP) to the point code in step 41. An entry for this message is then created in a pending database in step 42, which tracks the status of pending messages until they are deleted from the list as confirmed and delivered messages or time-out failed deliveries. Finally, in step 43, a history log is updated to indicate that a short message was generated and placed in the pending database at a certain time for attempted delivery.

Figure 5:
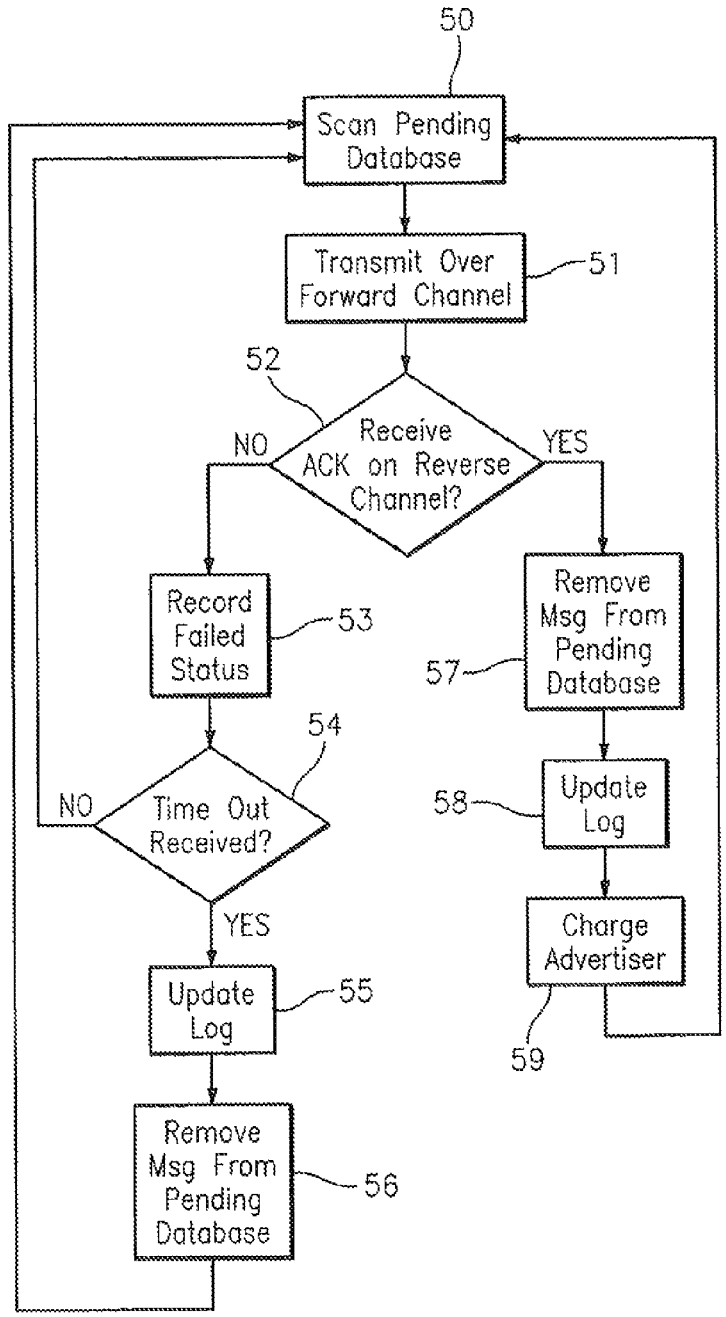
FIG. 5 is a flow diagram of a process for tracking and receiving acknowledgement information in accordance with an embodiment of the present invention.

As shown in FIG. 5, the system scans through the pending database in step 50 and attempts to deliver the pending messages to the mobiles. If the message is transmitted to a mobile over a forward control channel in step 51, and no corresponding acknowledgement is received over a reverse control channel, as determined in step 52, then the failed delivery status is recorded in the pending database in step 53. If it is determined in step 54 that the message remains pending after a "time out" period, then the history log is updated to indicate a failed delivery in step 55, and the record is deleted from the pending database in step 56. The advertiser that requested delivery of the advertisement is not charged for delivery of the advertisement. When a corresponding acknowledgement is received over a reverse control channel in step 52, a successful delivery status is recorded, the record is deleted from the pending database in step 57, and the history log is updated to charge the advertiser in step 58. Based upon this record, the advertiser's account is now charged for transmission of the advertisement in step 59.

III. Advertisers' Interface and Specifications

As described generally above, when an advertiser requests for the system to transmit advertisement information to local mobiles, the advertiser can customize the advertising campaign according to the advertiser's preferences. For example, the advertiser can specify whether the system will provide a text message, a text message with graphics, an audio message, a video message (when supported by the receiving wireless communications devices), or a combination of any of these. The advertiser enters the local addresses of the advertised establishments (e.g., a furniture store may be in two locations), and the approximate radius at which mobiles can receive advertisements. Using a table, the system will then calculate the cellsite IDs upon which to register the advertisement.

A variety of pricing arrangements can be devised according to the number of advertisements that are generated and the frequency by which advertisements are transmitted. The advertiser may wish to transmit a certain number of advertisements during periodic intervals throughout each day, during certain days of the week (e.g, weekends), during certain times of the day (e.g., lunch hour), during certain times of the month (e.g., the last week of each month). The advertiser may also be able to specify a priority associated with the delivery of the messages. In certain areas, such cell sites surrounding shopping malls, it may be known that a great number of advertisers may register with the service to transmit advertisements during peak times. An advertiser may wish to pay a peak rate to receive priority in generating advertisements during a specified peak time.

As also indicated above, the advertisements that are transmitted to the wireless communications devices may consist of promotional messages, coupons, or a combination of both. To increase the effectiveness of an advertisement, an advertiser may wish for the system to receive an acknowledgement signal from the user of a mobile that indicates whether the consumer desires to receive more of these messages or whether he is not interested in the advertised product or service. As described in the next section below, this information can then be stored as part of the consumer's personal demographics file, which determines which consumers receive which messages.

If the transmitted advertisement is a coupon, the consumer may also be enabled to respond to the network to redeem the coupon or directly contact the establishment. Using a "mobile originate" system, the mobile can originate a short message to the address in the network that sent the message. This feature that currently exists in wireless SMS technology allows a user to create a reply. Depending upon the particular configuration of the wireless communications device, the mobile could alternatively store the advertisement to either retrieve at a later time or to display to a merchandiser to redeem. Therefore, the consumer can be prompted to "press '1' to make a reservation, press '2' to save the message, or press '3' to block future messages from the advertiser." If the user either makes a reservation or saves the message, a signal can be transmitted back to the system, which will then send a notification to the advertiser that a particular coupon, sent at a particular time and having a coupon ID number, may or will be redeemed by the recipient.

To facilitate registration of an advertiser's requested advertisement or commercial information, the system can further include an Internet website interface that is accessible by advertisers to generate advertisement requests, edit advertisement messages in real time, and review account information. Upon setting up an account with the wireless advertising system, providing a corporate name, location, and payment information, a unique account number, user name, and password will be assigned. Upon subsequent access to the website, the advertiser can view the status of existing advertisement campaigns, edit the message or coupon that is to be transmitted, edit the delivery options (e.g., start and end times, interval, etc.), or create new advertising campaigns. The advertiser can also review account information, including a history of message delivery and status information, and can review coupon redemption notifications from consumers and reservation requests. As a full service website, the advertiser can also perform standard e-commerce activities, such as authorizing payments. In addition to receiving coupon redemption notifications over the website, the system can be configured to transmit this information in real time to the advertiser's standard email account, or through SMS delivery to the advertiser's wireless communications system.

Figure 6:
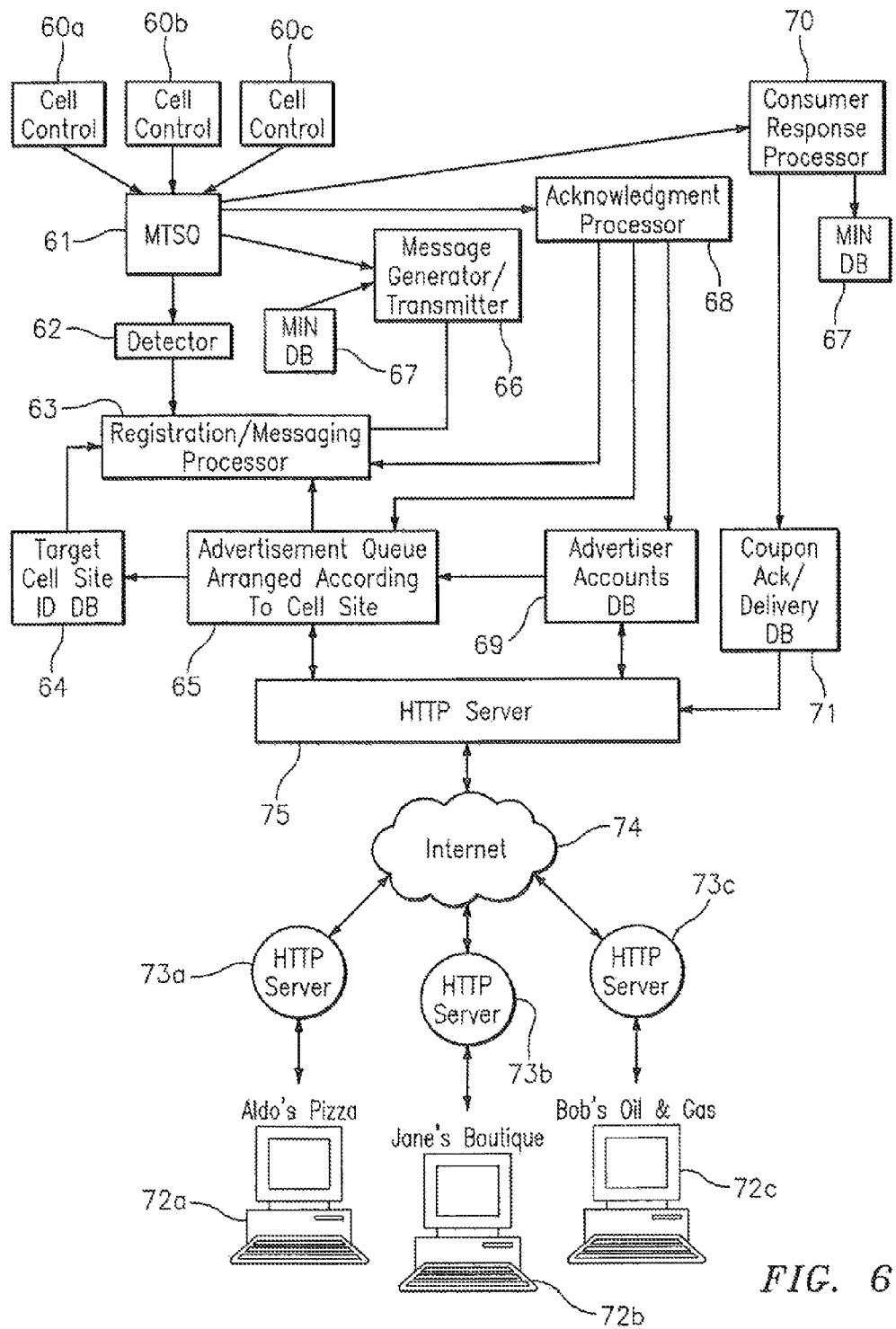
FIG. 6 is a schematic diagram of a system for generating and transmitting messages over a wireless network, with a user interface for creating messages, in accordance with an embodiment of the present invention.

FIG. 6 provides a schematic diagram of the message delivery processors and databases and the advertiser interface according to an embodiment of the present invention. Upon receiving registration information from a mobile via one of cell control 60a, 60b, or 60c, the information is transmitted via a cell control/MTSO link to MTSO 61. Detector 62 detects that the information provided to the MTSO 61 contains registration information, extracts the cell site ID and the MIN, and forwards this information to the Registration Messaging Processor 63. Registration processor 63 checks Target Cell Site ID database 64 to determine whether the cell site ID in which a registration occurred is a target cell site for which an advertiser requested transmission of an advertisement. If there are advertisements to be transmitted to mobiles located within that cell site ID, the Registration Messaging Processor 63 retrieves the appropriate advertisement information from the Advertisement Queue 65. The advertisement information from the queue is then forwarded to the Message Generator/Transmitter 66. As an optional feature, the MIN database 67 is accessed to confirm that the mobile user has not requested to block messages to this mobile. The message is then generated through the MTSO 61 to the appropriate cell control 60, to the designated mobile.

If the message is received by the intended mobile, an acknowledgement signal is automatically generated over the reverse control channel, which is transmitted to the MTSO 61 to the Acknowledgement Processor 68. The Acknowledgement Processor notifies the Registration Messaging Processor 63 to stop sending the message to the intended mobile. An acknowledgement signal is also communicated both to the Advertisement Queue 65, to advance the queue to a new message for the next registration, and to an Advertiser Accounts database 69, which maintains the advertiser's account information.

If the mobile user opts to respond to the generated advertisement (e.g., by redeeming a coupon), a mobile-initiated SMS message is generated and transmitted via the cell control 60 and MTSO 61 to the Consumer Response Processor 70. This is then forwarded to the Coupon Acknowledgement/Delivery database 71 to notify the advertiser. As explained in greater detail in the next section, the system can also notify the MIN database 67 to keep track of the mobile user's interests and demographics.

In the example provided in FIG. 6, advertisers Aldo Pizza 72a, Jane's Boutique 72b, and Bob's Oil & Gas 72c can access the advertising system via respective HTTP servers 73a, 73b, and 73c. The advertisers receive web pages over the Internet 74 via the advertising system HTTP server 75. The server 75 contains graphical interface software for generating a web page to provide a user interface to information in the Advertiser Accounts database 69 and the Advertisements Queue 65. Entering the advertiser's username and password or other account information, the advertiser can access account information, generate or edit advertisement requests through Advertiser Accounts DB 69, and can receive coupon redemption notifications through database 71.

IV. Consumer Interface

Figure 7:
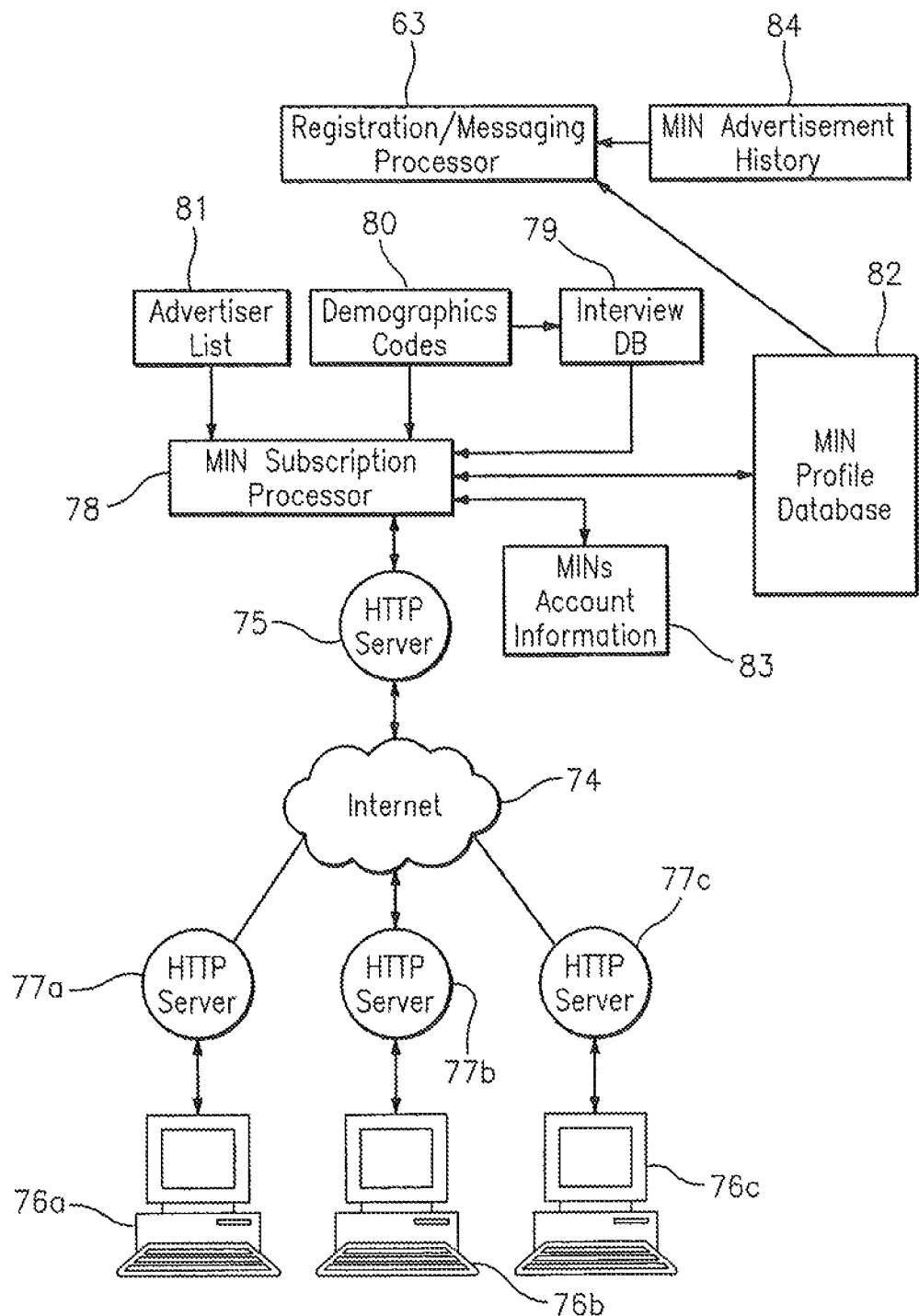
FIG. 7 is a schematic diagram of a user interface and system for users to provide preferences and register to receive messages over wireless communications devices, in accordance with an embodiment of the present invention.

In the example provided in FIG. 6, the mobile subscriber is able to block the transmission of messages if desired. In a further embodiment, the mobile subscriber can also register with the advertisement system to provide consumer interest and demographics information. In this manner, the mobile subscriber will receive advertisements concerning products and services that are of particular interest to the subscriber. As will now be described with reference to FIG. 7, by registering the subscriber's interests in a separate database system, the system can provide for targeted advertisements based upon both location and subscriber preferences.

Mobile subscribers 76a, 76b, and 76c can each log into the advertisement system to access their respective accounts and provide advertisement preferences information to receive targeted advertising. By logging into the advertisement system website through maintained on http server 75, connecting through respective http servers 77a, 77b, and 77c, and via the Internet 74, the mobile subscribers can enter a unique user name/password or other account information to access the personalized account. MIN Subscription Processor 78 guides the user interface. If the subscriber chooses to add or edit the subscriber's preferred advertisement choices and preferences, the Subscription Processor 78 receives interview questions from Interview database 79. The subscriber may be asked questions concerning gender, age, and occupation, and topics such as hobbies, food preferences, clothing, sports activities, home ownership, etc. For each response to a question, an appropriate demographic code, categorized in the Demographic Codes database 80, is stored in the subscriber's profile in MIN Profile Database 82. The subscriber may also be asked to identify or choose from a list of advertisers from which the subscriber would like to receive information. Likewise, the subscriber may also choose from a list of advertisers from which the subscriber would prefer to block advertisement information. The current list of advertisers who have registered with the system is maintained in Advertiser List database 81.

As described above with reference to the advertiser-based internet website, the subscriber can also utilize the website to perform commonly known e-commerce tasks, such as accessing the subscriber's wireless communications account or processing payment information, through MIN Account Information database 83. In a further embodiment, the advertisement system may provide free services or reduced billings as an incentive for the subscriber to participate in the advertising program. In such case, the MIN Subscription Processor 78 credits the subscriber's account in the MIN Account Information database 83.

Upon receiving and maintaining demographics codes that are associated with particular subscribers, the advertisement system can then utilize this information when allocating which advertisements are to transmitted to mobiles. Referring to both FIGS. 6 and 7, when registration information is detected in Detector 62 and the Registration Messaging Processor 63 is selecting an advertisement to transmit to the registered mobile from the Advertisement Queue 65, the Messaging Processor 63 also receives a set of demographics codes from the MIN Profile Database 82 that are associated with the mobile subscriber's preferences. If the demographics codes associated with a potential advertisement message do not correlate with the subscriber's interests, the Messaging Processor 63 reviews the next potential advertisement message from the Advertisement Queue 65. Before an advertisement is selected for transmission, the Registration Messaging Processor 63 also reviews the MIN Advertisement History database 84 (which is updated via the Acknowledgement Processor 68), to ensure that the subscriber is not continually receiving the same advertisement information.

Accordingly, the above-provided method and system enables consumers to receive personalized, targeted advertisement information or coupons over a wireless communications device as the device registers in certain cellular regions. Businesses are able to generate advertisements or coupons that are transmitted only to persons who are physically located within a reasonable vicinity of the business. Businesses can also send advertisements to mobile subscribers according to the subscribers' interests and buying habits and tastes, in order to generate more effective advertising. The advertising can be personalized and easily customized, edited, and scheduled.

The present invention is not limited to the transmission of short text messages to cellular telephones. The method and system for providing targeted advertising may be utilized with devices such as interactive pagers, personal digital assistants, vehicle or personal navigational systems, etc. The wireless devices may be mobile, handheld units, or fixed units within automobiles or other types of personal transportation vehicles, or within buses, airplanes, or other public transportation systems. As described above, the advertising media may consist of short text messages, graphics, audio or speech messages, video, or a combination of any of the above.

Further, it is not required to receive a mobile's location information via registration data. Any other means of identifying location information, such as through global satellite positions, cell signal triangulation, etc., are foreseen as being in the scope of the present invention. It is also not required to determine which advertisements are to be transmitted to which mobiles based upon the mobiles' locations. For example, as also described above, advertisements can be associated with demographics, and can be transmitted to mobiles whose users have indicated their preferences to receive advertisements associated with those demographics.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method comprising:
   receiving, at an advertisement system comprising a processor, a request to access a profile associated with a user of a wireless communications device, the profile associated with the user comprising advertisement preferences for receiving advertisements via the wireless communications device of the user;
   providing, by the processor via a user interface, a list of advertisers; and
   receiving, by the processor via the user interface, a selection of an advertiser from the list of advertisers from which the user requests advertisement information be received, the selection for updating the advertisement preferences of the profile associated with the user.

2. The method of claim 1, further comprising:
   providing, via the user interface, a question associated with demographics of the user;
   receiving, via the user interface, a response to the question; and
   adding a demographic code to the profile associated with the user, the demographic code corresponding to the response to the question.

3. The method of claim 2, wherein the demographics of the user comprise at least one of a gender of the user, an age of the user, an occupation of the user, hobbies of the user, or food preferences of the user.

4. The method of claim 2, further comprising:
   detecting a presence of the wireless communications device of the user within a location;
   determining the demographic code associated with the user; and
   selecting an advertisement comprising information relevant to the location to be transmitted to the wireless communications device of the user, the advertisement selected based on a demographic code of the advertisement correlating with the demographic code associated with the user.

5. The method of claim 4, further comprising determining, prior to transmitting the advertisement to the wireless communications device of the user, whether the advertisement selected has been previously transmitted to the wireless communications device.

6. A method comprising:
   registering, by an advertisement system comprising a processor, an advertisement with identification information of a cell site of a cellular network, the advertisement comprising a coupon;
   transmitting, by the advertisement system to a wireless communications device of a user located within the cell site of the cellular network, the advertisement, wherein the advertisement is transmitted to the wireless communications device based at least in part on the advertisement being registered with the identification information of the cell site within which the wireless communications device is located; and
   receiving, at the advertisement system from the wireless communications device, a response redeeming the coupon.

7. The method of claim 6, further comprising notifying an advertiser associated with the advertisement of the response redeeming the coupon.

8. The method of claim 6, further comprising updating, based on receipt of the response redeeming the coupon, a profile associated with the user comprising advertisement preferences for receiving advertisements via the wireless communications device of the user.

9. The method of claim 6, further comprising:
   receiving a request to access a profile associated with the user of the wireless communications device, the profile associated with the user comprising advertisement preferences for receiving advertisements via the wireless communications device of the user;
   providing, via a user interface, a list of advertisers; and
   receiving, via the user interface, a selection of an advertiser from the list of advertisers from which the user requests advertisement information be received, the selection for updating the advertisement preferences of the profile associated with the user.

10. The method of claim 9, further comprising:
providing, via the user interface, a question associated with demographics of the user;
receiving, via the user interface, a response to the question; and
adding a demographic code to the profile associated with the user, the demographic code corresponding to the response to the question, wherein advertisements received at the wireless communications device of the user correlate to the demographic code.

11. The method of claim 10, wherein the demographics of the user comprise at least one of a gender of the user, an age of the user, an occupation of the user, hobbies of the user, or food preferences of the user.

12. The method of claim 10, further comprising:
determining the demographic code associated with the user, wherein the advertisement is transmitted to the wireless communications device further based on a demographic code of the advertisement correlating with the demographic code associated with the user.

13. The method of claim 12, further comprising determining, prior to transmitting the advertisement to the wireless communications device of the user, whether the advertisement has been previously transmitted to the wireless communications device.

14. A system comprising:
a database storing a plurality of advertisements; and
a processor that performs operations comprising
registering an advertisement of the plurality of advertisements with identification information of a cell site of a cellular network,
transmitting, to a wireless communications device of a user located within the cell site of the cellular network, the advertisement from the plurality of advertisements, the advertisement comprising a coupon, wherein the advertisement is transmitted to the wireless communications device based at least in part on the advertisement being registered with the identification information of the cell site within which the wireless communications device is located, and
receiving, from the wireless communications device, a response redeeming the coupon.

15. The system of claim 14, wherein the operations further comprise notifying an advertiser associated with the advertisement of the response redeeming the coupon.

16. The system of claim 14, wherein the operations further comprise updating, based on receipt of the response redeeming the coupon, a profile associated with the user comprising advertisement preferences for receiving advertisements via the wireless communications device of the user.

17. The system of claim 14, wherein the operations further comprise:
receiving a request to access a profile associated with the user of the wireless communications device, the profile associated with the user comprising advertisement preferences for receiving advertisements via the wireless communications device of the user;
providing, via a user interface, a list of advertisers; and
receiving, via the user interface, a selection of an advertiser from the list of advertisers from which the user requests advertisement information be received, the selection for updating the advertisement preferences of the profile associated with the user.

18. The system of claim 17, wherein the operations further comprise:
providing, via the user interface, a question associated with demographics of the user;
receiving, via the user interface, a response to the question; and
adding a demographic code to the profile associated with the user, the demographic code corresponding to the response to the question, wherein advertisements received at the wireless communications device of the user correlate to the demographic code.

19. The system of claim 18, wherein the demographics of the user comprise at least one of a gender of the user, an age of the user, an occupation of the user, hobbies of the user, or food preferences of the user.

20. The system of claim 18, wherein the operations further comprise determining the demographic code associated with the user; wherein the advertisement is transmitted to the wireless communications device further based on a demographic code of the advertisement correlating with the demographic code associated with the user.

* * * * *